US012215893B1

(12) United States Patent
Radan

(10) Patent No.: US 12,215,893 B1
(45) Date of Patent: Feb. 4, 2025

(54) METHOD AND APPARATUS FOR SINGLE PIPE INSTANT WARM WATER SUPPLY IN BUILDINGS

(71) Applicant: Arvin Radan, Port Moody (CA)

(72) Inventor: Arvin Radan, Port Moody (CA)

(73) Assignee: Radinsight Consulting & Trading Co., Port Moody (CA)

( * ) Notice: Subject to any disclaimer, the term of this patent is extended or adjusted under 35 U.S.C. 154(b) by 0 days.

(21) Appl. No.: 18/230,631

(22) Filed: Aug. 5, 2023

(51) Int. Cl.
*F24H 1/10* (2022.01)
*F24H 15/148* (2022.01)
*F24H 15/174* (2022.01)
*H05B 6/80* (2006.01)
*F24H 9/20* (2022.01)

(52) U.S. Cl.
CPC ........... *F24H 1/101* (2013.01); *F24H 15/148* (2022.01); *F24H 15/174* (2022.01); *H05B 6/804* (2013.01); *F24H 9/2028* (2013.01)

(58) Field of Classification Search
CPC ....... H05B 6/804; F24H 1/101; F24H 15/174; F24H 15/148; F24H 9/2028
USPC .......................................................... 219/688
See application file for complete search history.

(56) References Cited

U.S. PATENT DOCUMENTS 4,304,292 A * 12/1981 Cardone ............... F24D 17/001 165/47
5,135,021 A * 8/1992 Pegg ......................... E03C 1/02 122/13.3
5,524,820 A * 6/1996 Regan ........................ F24H 1/08 122/13.3
6,929,190 B1 * 8/2005 Adrian ....................... F24H 1/06 237/52
7,000,637 B1 * 2/2006 Kjaer ......................... E03C 1/05 4/677
9,261,293 B2 * 2/2016 Peteri .................... E03C 1/0411
2003/0097710 A1 * 5/2003 Adrian ....................... F24H 1/06 4/598
2004/0031449 A1 * 2/2004 Long .......................... F24H 1/08 122/18.1
2005/0109763 A1 * 5/2005 Lee ........................ B64D 11/02 219/483
2008/0000616 A1 * 1/2008 Nobile ....................... E03C 1/00 165/47

(Continued)

FOREIGN PATENT DOCUMENTS

CN 207796252 U * 8/2018
CN 113154091 A * 7/2021

*Primary Examiner* — Michael C Zarroli

(57) ABSTRACT

A method and an apparatus are provided for on-demand and instant warm water supplying at the point of consumption. In this method only cold water is distributed and supplied to different places within a building through a single piping system. The apparatus has only a single input pipe for cold water and heats water in a heating unit just as needed on demand at the point of consumption after harvesting the heat energy of wastewater from drainage. The heating unit alternatives are an electric resistive element, a magnetron generating microwave, or a thermoelectric body warming the input water as needed and no more through a controller. No hot and cold-water mixer is used. The method and apparatus help the building industry save on plumbing costs and consumed energy and water, while bringing more comfort to users through direct and local discharging of warm water on demand and as adjusted instantly.

9 Claims, 2 Drawing Sheets

Apparatus

(56) References Cited

U.S. PATENT DOCUMENTS

| | | | | |
|---|---|---|---|---|
| 2012/0177349 | A1* | 7/2012 | Carvalhais | F24D 17/0005 165/10 |
| 2012/0237191 | A1* | 9/2012 | Clark | F24H 15/37 392/454 |
| 2014/0359935 | A1* | 12/2014 | Veros | E03C 1/055 4/677 |
| 2017/0307255 | A1* | 10/2017 | Spring | F24H 15/37 |

* cited by examiner

Fig. 1: Apparatus
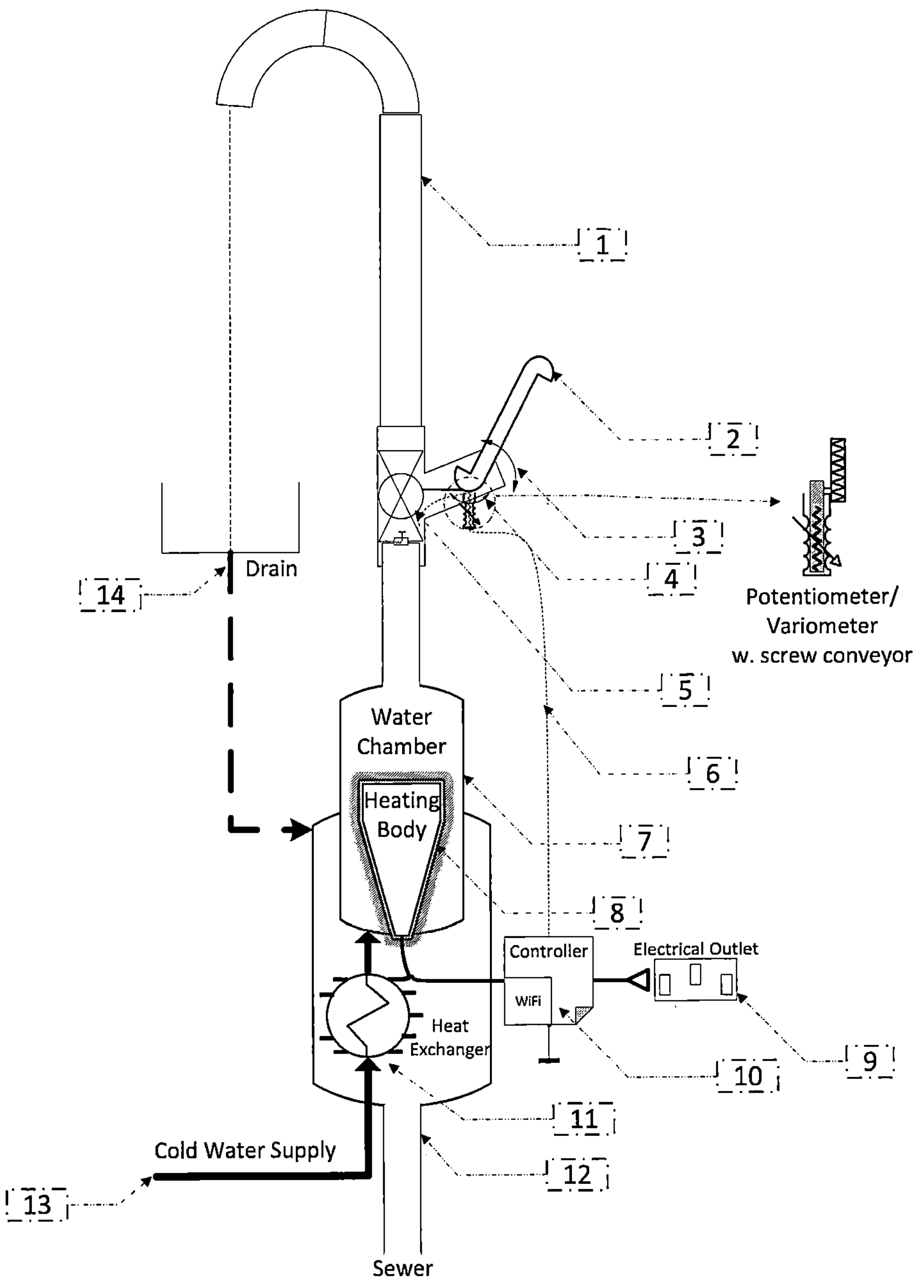

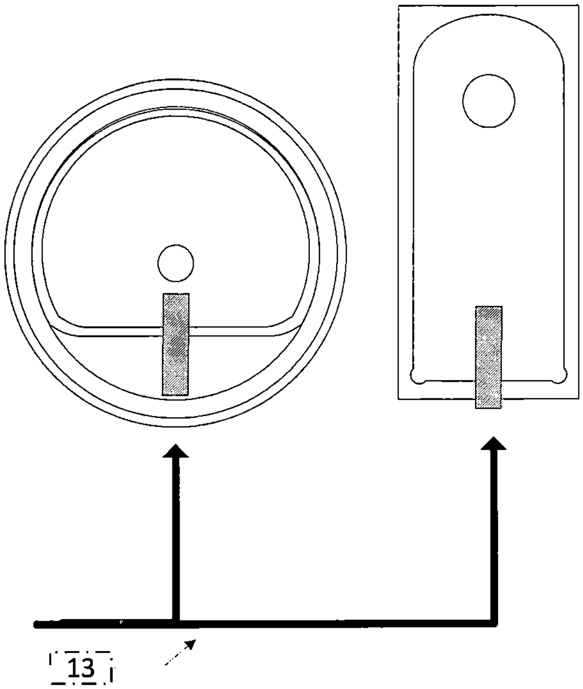
Fig. 2: Application Examples

METHOD AND APPARATUS FOR SINGLE PIPE INSTANT WARM WATER SUPPLY IN BUILDINGS

PRIOR ART

Different approaches for providing appropriate warm water at various locations of a building are known in the prior art. However, the intention of this innovation is to make the availability of warmed water without delay, on demand, cost-effective and efficient through heating the water locally as needed and not more.

CN 216590231 published in 2022 depicts an instant heating faucet and applying water purifying the same. The faucet is proposed to have electric heating for supplying instant hot water. The invention still has two pipelines and there is no means of adjustment for the water temperature or how much the water needs to be heated. Apparently, the proposed faucet mixes hot and cold water which is not an effective way. There is no closed-loop control on the amount of heat the water needs to gain.

U.S. Pat. No. 11,493,210 published in 2022 proposes an instant hot water delivery system where the hot water supplied from a water heater is stored in a thermal storage bin adjacent to a demand point to deliver the hot water instantly. This system requires hot water to be supplied and transmitted to the demand point, which is associated with additional costs and heat losses.

CN 214500223 published in 2021 introduces another instant heating faucet type without waste heat. The introduced faucet has an electric heater to heat the cold water and an electromagnetic valve mixing the right amount of cold and hot water to achieve the desired temperature. This solution is still not efficient because the water gets heated and then mixed with cold water to lose heat.

CA 3139419 published in 2021 discloses a hot and cold outdoor faucet system. In this system, the outdoor faucet will also be connected to an indoor hot water supply to prevent freezing risks, to provide hot and cold or warm water, and to prevent an individual from having to carry water from the interior to the exterior. This system is a typical hot- and cold-water interior faucet system applied to the exterior.

CA 3114335 published in 2019 introduces a hot water supply system which has the same architecture of conventional hot water supply system in buildings with a water heater and a hot- and cold-water mixer but likely with shorter pipes. It also adds a heat exchanger to partially harvest the heat energy of drainage. Connecting the system to a conventional faucet to mix hot and cold water, it employs a costly separate water heater to supply hot water. This system doesn't have any benefits. It overheats the water locally and then mixes it with cold water through a water mixing valve to deliver the desired temperature.

BACKGROUND OF THE INVENTION

Vast amounts of time and water are wasted daily while consumers wait for hot water at faucets located remotely from the building water heater. In some plumbing systems, this delay may be up to a few minutes resulting in wasting a considerable amount of freshwater annually. In some concepts, hot water circulating (three pipe plumbing system) or steady drainage of a small amount of hot water are used to overcome this problem and make the availability of hot water without delay, but all these concepts are associated with extra costs and energy and/or water wasting.

In terms of resiliency and self-sufficiency of net-zero buildings, cold water needs to be heated on demand and as needed at the point of consumption to avoid overheating for hot water transmission in a separate pipe. Warm water with different temperatures is needed for different applications at various locations in residential and commercial buildings. So, it doesn't make sense to overheat the water in a water heater, transmit it in a separate pipe and then mix it with cold water at the point of consumption; instead, water can be heated locally and as needed on demand at the point of consumption. The introduced invention overcomes these problems and is an efficient way to provide warm water at the needed temperature at the point of consumption. Harvesting the heat energy of drained wastewater and using it right away for the water being warmed is another feature of this solution. Modern methods of fast heating like microwaves and thermoelectric materials are integrated in this solution to make the system more efficient.

This invention can be classified as CPC E03C 1/044, E03 2001/005 and 0418, and F24D 3/82 and 87.

SUMMARY OF THE INVENTION

This invention relates to a smart system and apparatus for providing domestic instant warm water at the point of consumption on demand and as needed without any needs for a hot water tank and hot water pipe. It simplifies the water plumbing systems in buildings and harvests the heat energy of wastewater to be reused at the same application at the same time. Providing the users with more comfort in terms of adjusting the flow rate and temperature of instantly available warm water, the system employs a smart controller with on-board WiFi module to communicate with portable smart devices through the internet. Its concept and design are scalable to any size and capacity for different residential and commercial applications where warm water is needed on demand.

BRIEF DESCRIPTION OF DRAWINGS

FIG. 1 illustrates the apparatus concept realizing the method of this invention. This apparatus has only one input pipe for fresh cold water and one output duct connecting to sewer system for draining wastewater after harvesting its heat energy.

FIG. 2 shows two possible applications where only fresh cold water and drainage are connected. While simplifying the plumbing system in buildings, the apparatus provides instant adjustable warm water on demand.

DETAILED DESCRIPTION OF THE INVENTION

FIG. 1 depicts the apparatus comprising of a pipe or faucet [1] for discharging the warmed water and a handle [2] with two movement directions: a vertical movement [3] to adjust the required water flow rate through a V-shape ball valve with a built-in temperature sensor [5], and a circular movement to adjust the required water temperature through a potentiometer or an electric variometer for a better precision [4]. A small screw conveyer attached to the handle transfers the circular movement of handle to the linear vertical movement of a metal bar acting as the core of variometer coil in case of a variometer application or acting as a moving split pin of a potentiometer in case of potentiometer to set the water temperature as shown in FIG. 1. The potentiometer/variometer and temperature sensor are wired

[6] to a controller for regulating the water temperature using a closed loop control method. The apparatus further comprises a water chamber [7] with a built-in magnetron as the heating body [8] generating microwave, an outside body from thermoelectric material generating heat using electricity, or a combination of both for heating the water inside the chamber.

The electrical energy is supplied by a nearby electrical outlet [9]. The digital controller regulates the temperature of discharging water at the setpoint adjusted by the circular movement of handle and its potentiometer/variometer [4]. The controller receives the feedback signal of actual temperature of discharged water through the wire [6] from the built-in temperature sensor of V-shape ball valve [5]. It applies a closed-loop control method to maintain the temperature of discharged water regardless of its flow rate.

The bottom part of the apparatus is built with a wastewater chamber [12] and a built-in heat exchanger [11]. The cold-water supply pipe will be connected to the water input at the bottom of this chamber. This input is internally connected to the built-in heat exchanger and further connected to the water chamber as shown in FIG. 1. The input cold water flows through the built-in heat exchanger to harvest the heat energy of wastewater drained from the basin/sink/bathtub [14] of the application where the apparatus is used. The wastewater drained from the basin/sink/bathtub flows into the wastewater chamber through a connecting pipe and flows out to sewer piping system after exchanging its heat with the entering cold water through the built-in heat exchanger.

FIG. 2 illustrates two examples of applications where this apparatus can be used in a building. In the case of bathtub or shower tray, the apparatus embodiment will be installed underneath the tub/tray.

Through this method and its apparatus water plumbing system in a building will be reduced in size and cost and water heaters can be omitted as water will be warmed on demand locally and instantly. It saves water and energy consumption in contrast to traditional plumbing system where the users needed to wait and waste plenty of cold water inside the pipes until hot water reaches the point of consumption.

Traditional methods of instant hot water availability at the point of consumption include either three piping system and steady circulation of hot water which results in high plumbing costs and energy waste, or discharging a little amount of hot water to drainage at the point of consumption which results in wasting hot water. Recent inventions propose water heating faucets which heat water and mix it with cold water. It doesn't make sense to overheat water and then mix it with cold water. Apart from this deficiency, users have to waste some water and energy to adjust the desired water temperature and it is not a comfortable life style.

The invention claimed is:

1. An apparatus for on-demand instant heating and discharging warm water at the desired temperature at the point of consumption in the form of an integrated faucet that allows single-pipe water plumbing systems in buildings and comprises of:

a) a discharging faucet or pipe [1] connected to a small water chamber [7] through a V-shape ball valve [5] adjusting the flow rate of warm water and having a built-in temperature sensor;

b) a common handle [2] with two degrees of movement freedom: a vertical movement [3] that sets the flow rate of warm water through a V-shape ball valve and a circular movement that sets the warm water temperature through a potentiometer or an electric variometer for a better precision [4];

c) a small water chamber [7] with a built-in magnetron [8] generating microwave for heating the water inside the chamber instantly and directly to the desired temperature on-demand;

d) a controller that regulates the electrical energy supplied to the system [8] from a nearby electrical outlet [9] and is wired [6] to the handle potentiometer/variometer [4] and to the temperature sensor built-in the V-Shape ball valve [5];

e) an on-board WiFi module on the controller board for communicating with nearby portable smart devices through an application and with a central computer through the wireless internet;

f) a wastewater chamber with a built-in heat exchanger from thermoelectric materials to harvest the heat energy of drained wastewater before flowing into a sewer system;

g) a single cold-water input passing through the built-in heat exchanger inside the wastewater chamber before entering the water chamber [7];

h) a wastewater input collecting wastewater from a drain to harvest its heat energy in the wastewater chamber [12];

i) a wastewater output that will be connected to a building's sewer pipe.

2. The apparatus as claimed in claim 1, wherein it forms a portable cabinet-size modular unit in any size and capacity as an on-demand and instant warm water dispenser for all residential and commercial applications to eliminate the need for separate water heaters and associated hot water piping of any kind.

3. The apparatus as claimed in claim 2, wherein the magnetron generating microwave is protected by a porcelain cover and is placed at the bottom center of the water chamber.

4. The apparatus as claimed in claim 3, wherein the outside body of the water chamber is from PVC material with a metal web in the variant of microwave heating only.

5. The apparatus as claimed in claim 3, wherein the outside body of the water chamber is from thermoelectric materials in the variant of combined microwave and thermoelectric heating.

6. The apparatus as claimed in claim 4 or 5, wherein the circular movement of its handle and the potentiometer/variometer [4] are replaced with any other user interface tools like a touch screen for adjusting the water temperature as a variant.

7. The apparatus as claimed in claim 4 or 5, wherein the handle [2] is completely replaced with any other user interface tools like a touch screen and motorized V-shape ball valve [5] for a fully automated warm water dispenser as a variant.

8. The apparatus as claimed in claim 4 or 6, wherein its heat exchanger is equipped with active thermoelectric materials absorbing wastewater heat and converting it to electricity for improving the efficiency as a variant.

9. The apparatus in any variants as claimed in claim 4, 5, 6, 7 or 8 wherein the data (volume and temperature) of warm water usage are received by an application via the WiFi module of the controller to calculate the amount of water and energy consumed for displaying live data about the amount of consumed and saved energy and water on portable smart devices to raise awareness of sustainability.

* * * * *